Dec. 1, 1953   E. A. NEUGASS   2,660,824
INSTRUMENT PANEL
Filed Nov. 9, 1951
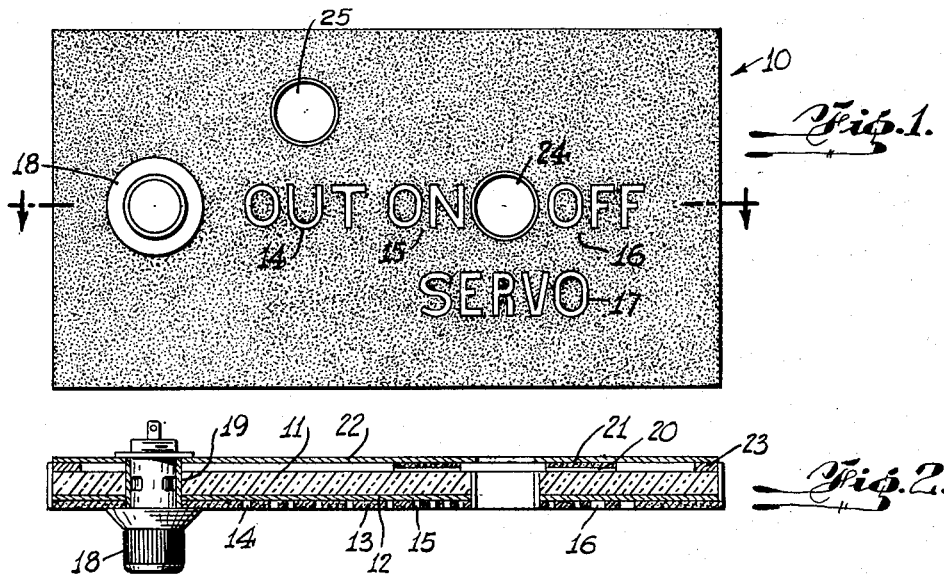
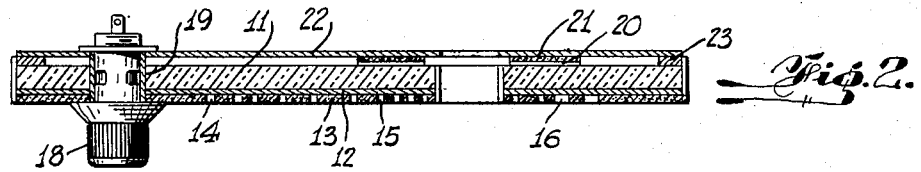
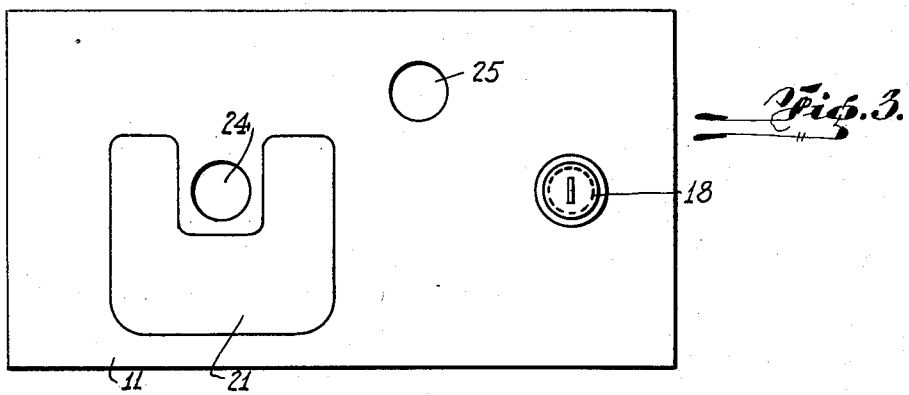
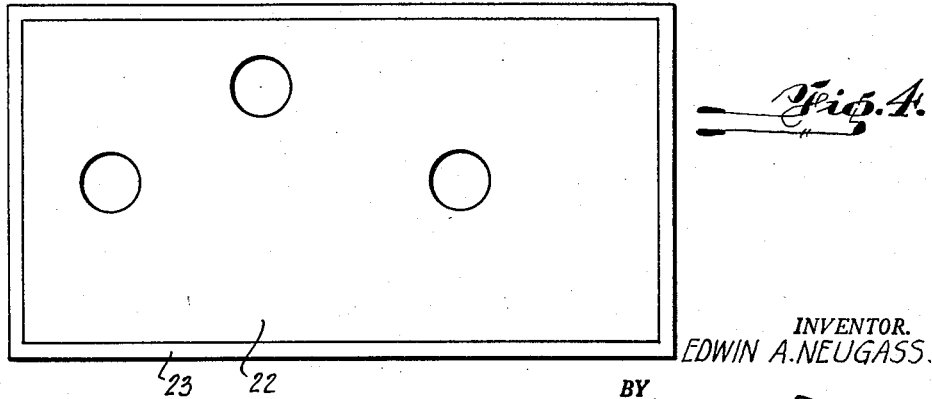
INVENTOR.
EDWIN A. NEUGASS.
BY
ATTORNEY.

Patented Dec. 1, 1953

2,660,824

UNITED STATES PATENT OFFICE 2,660,824

INSTRUMENT PANEL

Edwin A. Neugass, White Plains, N. Y.

Application November 9, 1951, Serial No. 255,707

11 Claims. (Cl. 40—130)

The present invention relates to improvements in panels for aircraft instruments and the like, and is particularly directed to improvements in such panels of the kind that are internally illuminated.

It is an object of the present invention to provide an internally illuminated panel wherein the various engraved characters are sharply defined with uniform intensity and without regard to the distances of such characters from the source or sources of light.

Another object of the present invention is to provide a laminated panel having a transparent or light transmitting core or body with a translucent layer and a superposed penetrated opaque layer on the front face of the core and similar layers on selected areas of the polished rear face of the core to substantially equalize the intensity of the light transilluminated through the front translucent layer at the locations variously distanced from the light source or sources emitting light to the transparent core and at which the opaque front layer is penetrated to define the desired characters.

The above and other objects, features and advantages of the present invention will clearly appear from the detailed description given below taken in connection with the accompanying drawings which form a part of this specification and illustrate, merely by way of example, one embodiment of the invention.

The invention consists in such novel features, arrangements and combinations of parts as may be shown and described in connection with the panel herein disclosed by way of example only and as illustrative of a preferred embodiment.

In the drawings:

Fig. 1 is a front elevational view of a panel constructed in accordance with an embodiment of the present invention;

Fig. 2 is a horizontal sectional view taken along the line 2—2 of Fig. 1;

Fig. 3 is a rear elevational view of the panel of Fig. 1, but with the rear shield thereof removed; and Fig. 4 is a front elevational view of the rear shield of the panel of Fig. 1.

In illuminating instrument and control panels located in the operating area of a vehicle, such as, for example, the cockpit of an airplane or the bridge or wheel-house of a ship, it is necessary that the illumination be glareless and preferably of a red color to maintain the dark adaptation of the pilot's or operator's eyes. This requirement is set forth in the United States Air Force-Navy Aeronautical Specifications, which further require that there be a high degree of color contrast between the surface of the panel bearing the instruments or controls and any lettering or other indicia adorning the panels when viewed in daylight and that the panels have low specular gloss to reduce reflection of light emitted from other sources in the cockpit or wheel-house.

Panels that substantially satisfy these requirements have been provided in United States Patent No. 2,518,726 wherein the panel consists of five layers of material, the center layer being transparent, the two next adjacent layers being translucent and superimposed directly upon the transparent layer at the opposite sides thereof, and the front and back outer layers being opaque and superimposed directly upon the translucent layers. The indicia on such panels are provided by suitably shaped openings extending through the front opaque layer to the underlying layer of translucent material. The panel is illuminated by a light source extending into the central core or body of transparent material and having a suitable red filter extending thereabout to direct colored light through the central transparent layer for transilluminating the translucent layer at the indicia defining opening in the front opaque layer. In order to provide the necessary high color contrast when viewed in daylight, the outer opaque layer, having the openings formed therein, is preferably black, while the translucent layers are white, and the low specular gloss at the front surface of the panel is achieved by giving the opaque layers a matte finish.

While panels of the kind disclosed in the above identified patent have proven satisfactory in most respects, it has been found that in actual practice the intensity of illumination of the various indicia or lettering provided at the front face of the panel varies with the distance of the respective indicia from the light source directing light into the central transparent core or body. In accordance with the present invention, this defect is remedied by forming the translucent and opaque layers at the rear of the panel so that such layers cover only selected areas of the rear surface of the central core or body of transparent material. It has been found that a smaller percentage of the light transmitted through the transparent core or body will be reflected forwardly for transilluminating the translucent layer at the portions of the panel which are devoid of the rear translucent and opaque layer, than at those areas of the panel having the last mentioned layers. Therefore, uniformity in the intensity of the transillumination may be obtained by providing the rear translucent and opaque layers only at those portions of the panel remote from the light source or sources.

Referring now to the drawings, wherein like reference numerals denote the same parts in the several figures thereof, a preferred embodiment of the present invention is there shown. The illustrated panel, generally indicated by the reference numeral 10 includes a core or body 11 made up of a sheet of clear, transparent light-transmitting material, preferably plastic, such as, for example, methyl methacrylate, and having a relatively thin layer, coating or film 12 of light colored, preferably white, translucent material, superimposed upon the front surface thereof. The translucent layer 12 is preferably plastic and of the class of polyvinyls or vinyl resins or materials, their polymers or copolymers, such as, for example, polyvinyl chloride, vinyl chloride-acetate co-polymer, polyvinylidene chloride, or vinyl chloride-vinylidene chloride co-polymers. The panel 10 further includes an opaque outer layer 13 superimposed over the translucent layer 12 and formed of a suitable opaque material, preferably plastic, such as, for example, vinyl having preferably a matte finish and of a dark, preferably black, color.

The front opaque layer 13 is provided with suitably shaped openings extending therethrough to uncover, or expose, the underlying portions of the translucent layer 12 and formed to define the desired indicia or lettering. For example, as seen in Fig. 1, the opaque layer 13 may be formed with the openings 14, 15, 16 and 17, respectively, defining the words "Out," "On," "Off" and "Servo."

Illumination of the panel is provided by means of suitable panel lights, only one of which is shown and indicated by the numeral 18, and may be conventional in construction, such as, panel lights manufactured under part number A4295 by the Grimes Manufacturing Company, Urbana, Ohio. Such lights are inserted in suitable holes or openings extending through the panel, and are preferably enclosed within a colored filter 19 (Fig. 2) so that the light directed into the central transparent core 11 will be colored, for example red, in order to maintain the dark adaptation of the observer's eye. Light emitted from the panel light 18 will be transmitted through the body 11 to transilluminate the translucent layer 12 at the various openings 14, 15, 16 and 17. The light serving to produce such transillumination will consist of rays which impinge directly against the forward surface of the body 11 at angles greater than the angle of reflection, and also rays which are reflected from the rear surface of the transparent body and then impinge against the front surface at angles greater than the angle of reflection. Since the light emitted from the assembly 18 may be considered to originate at a point source, such rays will diverge from that point source towards the remote areas of the panel. Thus, ordinarily the intensity of the light available within the transparent body 11 will be less at the portions thereof remote from the panel light than at the areas of the panel located close to the panel light. However, in accordance with the present invention, the intensity of transillumination at the portions of the layer 12 remote from the source of light is made substantially equal to the transillumination of that layer at the portion of the latter close to the panel lights. This equalization is achieved by providing a layer 20 covering the portions of the rear surface of the body 11 that are disposed behind the openings, for example the openings 15, 16 and 17, remote from the light source. The layer 20 is preferably formed of a translucent, white vinyl material, similar to that employed for the layer 12, and serves to reflect the light forwardly towards the layer 12 that would otherwise escape through the rear surface of the body 11. Thus, the intensity of light is equalized by providing "hot" areas of reflected light behind those indicia defining openings remote from the light source. An outer layer 21 of an opaque, preferably dark colored plastic material, is superimposed upon the aforementioned layer 20.

Since the portions of the rear surface of the transparent body 11 other than those covered by the layer 20, are bare, a shield 22, preferably formed of metal, and coextensive with the body 11 is provided behind the latter. The shield 22 has a coating 23 (Figs. 2 and 4) on the edge portions of the front face thereof. The edge portion coating 23 is formed of a dark material, for example, a paint, having a matte finish so that the light escaping from the uncovered portions of the rear surface of the body 11 will not be forwardly reflected at the edges of the panel towards the observer. The panel may be further provided with openings, such as the openings 24 and 25 to receive the shafts for various control knobs and the like, and such openings are coated with a dark opaque material, for example, paint, to prevent the escape of light therethrough. Similarly, the edges of the panel are coated with a dark opaque material, for example paint, so that the light emitted from the source 18 will be confined within the panel, and permitted to escape only through the indicia defining openings.

The sandwiching together of the body 11 and the layers 12, 13, 20 and 21 may be achieved by any one of several conventional methods. For example, the body 11 and the various layers may be coated with an adhesive, and the superposed layers and body, or sandwich, then passed through a set of rolls, which squeeze out any excessive adhesive, disperse it uniformly over the entire area, and assist the adhesive, in bonding the layers to each other and to the respective faces of the body 11. Another method, and the preferred one, is to place the transparent plastic body in a press with heated platens, between the layers 20 and 12 and bond these three pieces together by means of heat and pressure. This lamination is then placed on the press between the vinyl opaque layers 13 and 21 and a new lamination made by the application of heat and pressure. After the sandwich has been produced, the panel may then be fabricated to suitable size and shape, with the drilling of proper holes or other machine work then being performed. The last machine operation, preferably is the engraving of all the required indicia. In so forming the indicia, the engraving tool is allowed to penetrate only the front opaque layer 13 so that the translucent layer 12 will remain at the inner end of the various openings.

From the foregoing description, it is apparent that the present invention provides panels of the described character wherein the various indicia are illuminated with uniform intensity irrespective of the distances of such indicia from the light source.

While I have described and illustrated a specific preferred embodiment of my invention, it is to be understood that the invention is not limited to that precise embodiment and that various modifications, obvious to one skilled in the art, may be made without departing from the scope or spirit of the invention as defined in the appended claims.

What I claim is:

1. A panel comprising a body of transparent material with a next adjacent layer of translucent material superimposed on the front face thereof, and an outer layer of opaque material superimposed over said translucent layer, said outer layer having openings therethrough uncovering the underlying portions of said translucent layer and defining indicia, means for admitting light to said transparent body to transilluminate the translucent layer at the openings in the opaque layer, and a light concentrating coating covering the portions of the rear surface of said transparent body registering with the openings in said opaque outer layer remote from said light admitting means so that the transillumination at said openings is of substantially uniform intensity.

2. A panel comprising a body of transparent material with a next adjacent layer of translucent material superimposed on the front face thereof, and an outer layer of opaque material superimposed over said translucent layer, said outer layer having openings therethrough uncovering the underlying portions of said translucent layer and defining indicia, means for admitting light to said transparent body to transilluminate the translucent layer at the openings in the opaque layer, a light concentrating coating covering only those areas of the rear surface of said transparent body disposed behind those openings in said opaque outer layer which are remote from said light admitting means for equalizing the intensity of transillumination at the several openings, and an opaque shield member disposed behind said transparent body and coextensive therewith having a coating of dark non-reflective material along the edge portions of the forward surface thereof to prevent forward reflection of the light escaping rearwardly from the panel adjacent the edges of the latter.

3. A panel as set forth in claim 1; wherein said light concentrating coating includes a layer of light colored translucent material superimposed against said rear surface of the transparent body and a dark colored opaque layer superimposed upon said light colored translucent layer.

4. A panel as set forth in claim 2; wherein said light concentrating coating includes a layer of light colored translucent material superimposed against said rear surface of the transparent body and a dark colored opaque layer superimposed upon said light colored translucent layer.

5. A panel comprising a body of transparent material with a next adjacent layer of translucent light colored material superimposed on the front face thereof, and an outer layer of opaque dark colored material superimposed over said translucent layer, said outer layer having openings therethrough uncovering the underlying portions of said translucent layer and formed to define indicia, at least one light emitting means for directing light through said transparent body to transilluminate the translucent layer at the openings in the opaque layer, the rear surface of said transparent body being polished and having a light concentrating coating superimposed only on the areas thereof located behind those openings in said opaque layer which are remote from said light emitting means to substantially equalize the intensity of the transillumination of said translucent layer at the openings in the opaque layer without regard for the distance of said openings from said light emitting means.

6. A panel as set forth in claim 5; wherein said light concentrating coating includes a layer of light colored translucent material disposed against said areas of the rear surface of said transparent body.

7. A panel as set forth in claim 5; wherein said light concentrating coating includes a layer of light colored translucent material disposed against said areas of the rear surface of said transparent body, and a rearmost opaque, dark colored layer superimposed over the last mentioned translucent layer.

8. A panel as set forth in claim 7; including an opaque shield member disposed behind said body and the layers superimposed thereon, said shield member being substantially coextensive with said body and having a coating of dark colored non-reflective material along the edge portions of the forward surface thereof to prevent forward reflection of the light escaping rearwardly from the edge portions of the panel.

9. A panel comprising a body of transparent material with a next adjacent layer of translucent material superimposed on the front face thereof, and an outer layer of opaque material superimposed over said translucent layer, said outer layer having openings therethrough uncovering the underlying portions of said translucent layer and formed to define indicia, at least one light admitting means extending into said transparent body for directing light through the latter to transilluminate said translucent layer at the openings in the opaque layer, the rear surface of said body being polished and having a layer of white colored vinyl superimposed only on the areas thereof which are disposed behind the indicia defining openings remote from said light emitting means to increase the proportion of the light passing through said body and impinging against said areas of the rear surface that is reflected forwardly for transilluminating said remote openings to thereby substantially equalize the intensity of transillumination at portions of the panel spaced unequally from said light emitting means.

10. A panel as set forth in claim 9; including a layer of dark opaque material superimposed over said layer of white colored vinyl.

11. A panel as set forth in claim 10; including an opaque shield member disposed behind said body and the layers superimposed thereon, said shield member being substantially coextensive with said body and having a coating of dark colored non-reflective material along the edge portions of the forward surface thereof to prevent forward reflection of the light escaping rearwardly from the edge portions of the panel.

EDWIN A. NEUGASS.

References Cited in the file of this patent

UNITED STATES PATENTS

| Number | Name | Date |
|---|---|---|
| 2,150,836 | Lamb | Mar. 14, 1939 |
| 2,207,585 | Gaspar | July 9, 1940 |
| 2,518,726 | Shlenker | Aug. 15, 1950 |
| 2,561,672 | Pritikin | July 24, 1951 |